United States Patent
Regan

[11] 3,815,882
[45] June 11, 1974

[54] REVERBERATORY FURNACE USING WASTE GAS FOR COMBUSTION

[75] Inventor: John William Regan, Windsor, Conn.

[73] Assignee: Combustion Engineering, Inc., Windsor, Conn.

[22] Filed: Dec. 15, 1972

[21] Appl. No.: 315,707

[52] U.S. Cl.................. 266/19, 266/15, 266/16, 266/35, 122/7 R
[51] Int. Cl............................................ F27d 17/00
[58] Field of Search .................. 266/15, 16, 19, 35; 122/7 A, 7 R

[56] References Cited
UNITED STATES PATENTS
| | | | |
|---|---|---|---|
| 283,342 | 8/1883 | Henderson | 266/15 X |
| 1,573,427 | 2/1926 | Stout | 122/7 R |
| 2,319,399 | 5/1943 | Hamm | 122/235 |
| 2,606,103 | 8/1952 | Hamm | 122/235 R X |

FOREIGN PATENTS OR APPLICATIONS
| | | | |
|---|---|---|---|
| 131,464 | 4/1951 | Sweden | 122/479 |

Primary Examiner—Roy Lake
Assistant Examiner—Paul A. Bell
Attorney, Agent, or Firm—John F. Carney

[57] ABSTRACT

This disclosure involves a reverberatory furnace installation including a steam generating system in which auxiliary steam for the process is superheated in a separately fired superheater and a method of operating the same. Excess air is employed in the combustion process within the superheater and the exhaust gas therefrom passed directly into the reverberatory furnace for use in the combustion and reduction processes therein. Superheat temperatures of the steam are controlled by regulating the amount of air supplied to the burners of the superheater.

7 Claims, 1 Drawing Figure

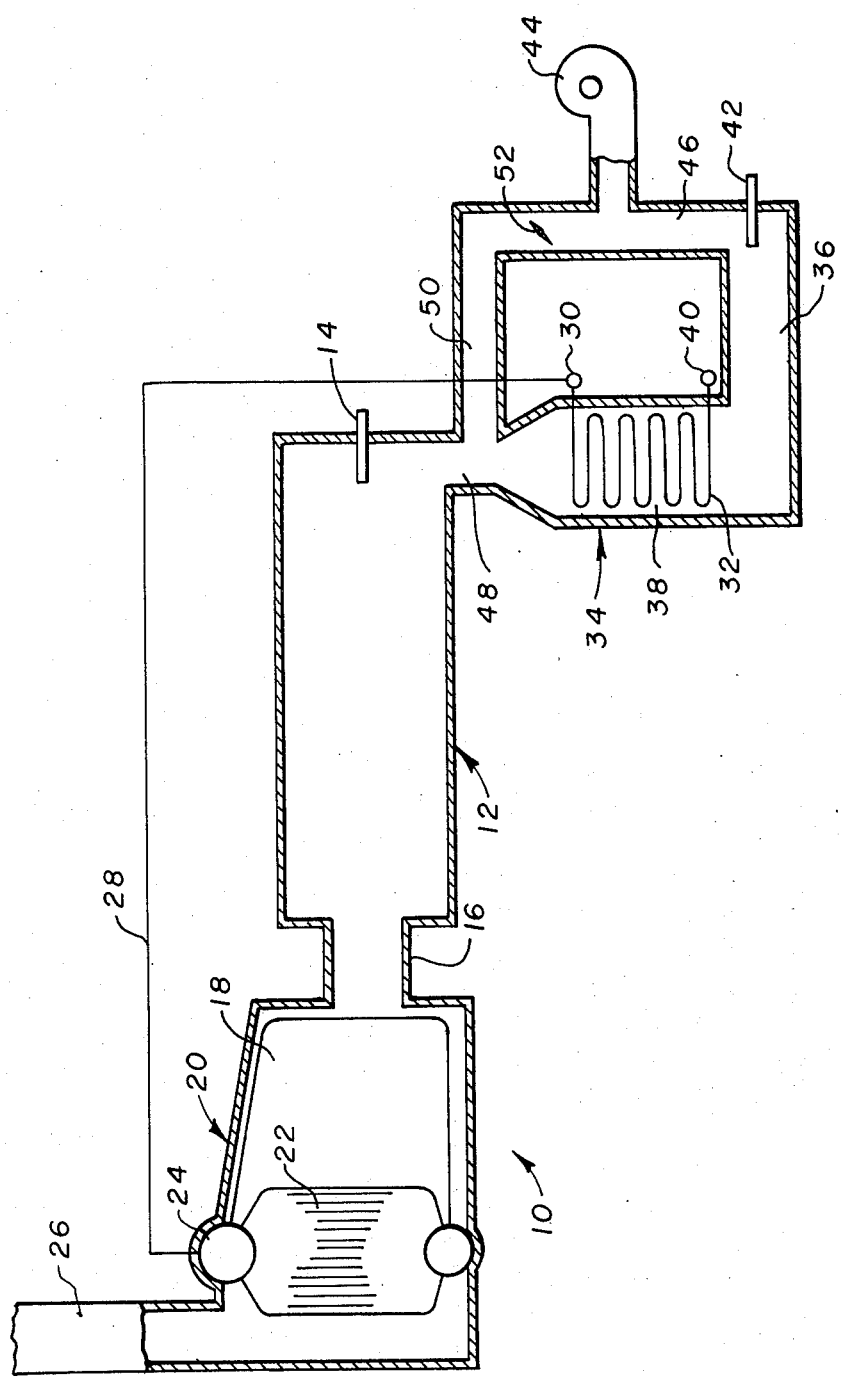

REVERBERATORY FURNACE USING WASTE GAS FOR COMBUSTION

BACKGROUND OF THE INVENTION

Industrial processes for heating metal ores to a high temperature in order to extract the metals contained therein have usually been characterized by low thermal efficiency and are expensive to construct and to operate. Such processes normally comprise a reverberatory furnace in which the ores are processed and a heat exchanger for cooling the gases from the furnace prior to their discharge from the system. In most applications the heat exchanger is a waste heat boiler in which steam is produced by the heat extracted from the gases. It is common in such installations to provide a separately fired superheater to heat the steam produced in the waste heat boiler to temperatures permitting its more effective use in the industrial process, such as to operate turbines employed to drive pumps and other equipment.

It has been the practice in the past, in an attempt to better utilize the heat produced for operation of the process, to use the combustion gases generated in the separately fired superheater to heat the air that is admitted to the reverberatory furnace, such air being employed to support combustion of the fuel fired therein and otherwise to react with the ores to effect their reduction. In these installations indirect air heaters, either of the tubular or the rotary regenerative type, have been employed. The use of these air heaters is costly in that they represent a significant equipment cost in the construction of the system. They also represent a substantial operating expense in that, in addition to usual operational and maintenance expenses, much of the heat produced to raise the temperature of the air is lost to the system, being simply discharged therefrom after being passed through the air heater. This results in additional heat having to be produced elsewhere in the system, such as in the reverberatory furance and/or in the waste heat boiler, to operate the process effectively thereby giving rise to additional fuel costs.

A still further drawback of these installations is that the steam outlet temperature from the superheater is difficult to control, being largely dependent upon the firing rate of the reverberatory furnace. To improve this situation it has been the practice to excessively heat the steam and to control its outlet temperature by the use of spray desuperheaters. This, of course, adds further to the equipment and operating cost of the system.

It is to the alleviation of these problems, therefore, that the present invention is directed.

SUMMARY OF THE INVENTION

According to the present invention a reverberatory furnace installation of the type described is provided with means for supplying an excessive amount of air to the combustion chamber of the separately fired superheater than is necessary for complete combustion of the fuel burned therein. The discharge end of the superheater combustion chamber is connected directly to the reverberatory furnace inlet whereby the oxygen-rich, heated exhaust gases are utilized in the combustion process of the fuel supplied thereto. By means of the described organization the construction costs of the installation are reduced in that the need for apparatus to effect indirect heating of the air supplied to the reverberatory furnace is eliminated. Significant reduction in installation operating costs are also realized in that the heat contained in the exhaust gases can be utilized in the reverberatory furnace instead of being passed out the stack as in prior art arrangements.

The means for supplying air to the system also includes a bypass duct around the superheater combustion chamber and a flow regulator damper within the bypass duct for proportioning the amount of combustion air admitted to the superheater. This arrangement permits the steam outlet temperature from the superheater to be controlled without need for a desuperheating spray and independently of the firing rate of the reverberatory furnace.

The objects and advantages of the present invention will become evident when the following description is read in conjunction with the attached drawing.

DESCRIPTION OF THE DRAWING

The single FIGURE is a schematic representation of a reverberatory furnace installation arranged according to the teaching of the present invention.

DESCRIPTION OF THE PREFERRED EMBODIMENT

In the drawing numeral 10 indicates an installation according to the invention for the reduction of metallic ores to extract the metals contained therein. The described installation is particularly adapted to obtain copper from its ore. It includes a reverberatory furnace 12 in which, as is well known, heat is supplied to a bed of ore to puddle or melt the metal contained therein. Means (not shown) are provided to ultimately withdraw the metal in molten form and to discharge the ore residue. Fuel for the ore reduction process is supplied to the furnace through a burner nozzle 14. At its gas discharge end the reverberatory furnace 12 is connected by conduit 16 or the like to the radiation chamber 18 of a waste heat boiler 20. The interior of the boiler 20 is provided with heat exchange tubes including a boiler bank 22 through which feed water is circulated to be transformed into steam by extracting heat from the gases supplied to the boiler. Steam produced in the boiler is collected in a steam drum 24 while the spent combustion gases are discharged through conduit 26 for further processing prior to ultimate discharge to the atmosphere.

The steam drum 24 is connected by line 28 to the inlet 30 of a tubular heating element 32 housed within the setting of a separately fired superheater 34. The setting of the superheater 34 is divided into a combustion chamber 36 and a convection section 38. Saturated steam from the drum 24 is circulated through the heating element 32 located in the convection section 38 of the superheater to extract heat from combustion gases generated in the combustion chamber 36 in order to raise the steam temperature to superheat levels prior to its discharge through steam outlet 40. Fuel is supplied to the combustion chamber 36 by means of burner nozzle 42 and combustion air is supplied by fan 44 through duct 46.

According to the present invention the gas discharge end of the superheater 34 is directly connected, as at 48, to the reverberatory furnace 12 in close proximity to the burner 14 whereby oxygen contained in the high temperature gases discharged from the superheater is utilized to support combustion of the fuel from the burners and to otherwise operate in the processing of the ore within the reverberatory furnace. An air bypass duct 50 containing a flow regulating damper 52 is connected between the fan 44 and the outlet of the superheater 34 upstream of its connection 48 with the reverberatory furnace 12 for proportioning the air supply to the system as hereinafter described. Control means (not shown) may be provided to operate the damper 52 in response to the temperature of the steam emerging from the outlet 40 of the heating element 32 whereby operation of the damper is effective to regulate steam outlet temperature.

In operation, fan 44 supplies air to the system at a rate sufficient to satisfy the oxygen needs of the reverberatory furnace 12. During period of normal operation, the damper 52 in bypass duct 50 is positioned to pass part of the air through duct 46 to the combustion chamber 36 of the direct fired superheater 34 and the remainder through bypass duct 50. The amount of air supplied to the combustion chamber 36 through duct 46 is in excess of that necessary to effect complete combustion of the fuel supplied by burner nozzle 42. The resulting high temperature combustion gases together with the entrained excess air are passed through the convection section 38 of the superheater 34 to heat the steam circulated through the heating element 32 to the desired temperature. Downstream of the heating element 32 the combustion gas and entrained air mix with the air passed through bypass duct 50 prior to passing through connection 48 into the reverberatory furnace 12. Within the furnace 12 the oxygenrich heated gaseous mixture is combusted with the fuel supplied by the burner nozzle 14 to supply the desired heat and oxygen to effect reduction of the ore within the furnace. The resultant gaseous fluid is then passed to the radiation chamber 18 of the waste heat boiler 20 where steam is generated and the fluid cooled prior to its discharge through conduit 26.

The position of the damper 52 in the duct 50 and the amount of fuel supplied through burner nozzle 42 are such as to provide the desired air mixture temperature at the connection 48 into the reverberatory furnace 12. The heat generated by the combustion gases in chamber 36 of the superheater 34 is employed to superheat the steam circulating through the heating element 32. Adjustments can be made in the temperature of the steam emerging from the superheater outlet 40 by altering the position of the damper 52. Opening the damper 52 results in an increase in steam outlet temperature in that a greater amount of cold air is passed through the duct 50 and a concomitantly less amount of air through duct 46. This air represents part of the excess air in the air stream thereby giving rise to higher temperatures occurring in the gas flowing through the convection section 38 of the superheater.

Conversely, if it is desired to reduce the steam outlet temperature, the damper 52 is operated to further restrict cold air flow through the duct 50. This results in an increase in the amount of excess air passed through the combustion chamber 36 thereby reducing the temperature of the gases from which heat is extracted to superheat the steam in element 32. When adjustments are made in the damper positions concomitant adjustments may be made in the amount of fuel passed through the burner nozzle 42 to maintain the desired air mixture temperature at the connection 48.

It will thus be appreciated that one of the important advantages of the present invention is that steam superheat temperatures can be controlled without the need of a desuperheating spray and independently of the firing rate of the reverberatory furnace.

Another advantage of the invention over conventional prior art systems in which the combustion gas for firing the superheater indirectly heats the air supplied to the reverberatory furnace is that the heat in excess of that necessary to preheat the air is not discharged to the atmosphere but is instead passed into the reverberatory furnace to be employed therein in the ore reduction process. This results in a significant savings in fuel costs. Further cost savings are also realized over these conventional prior art systems in that the heat transfer apparatus, such as the rotary regenerative or tubular air heater, and their ancillary equipment are no longer required.

It will be understood that various changes in the details, materials, and arrangements of parts which have been herein described and illustrated in order to explain the nature of the invention, may be made by someone skilled in the art within the principle and scope of the invention as expressed in the appended claims.

What is claimed is:

1. A process for the reduction of metal ores in a reverberatory furnace in a system in which the waste gas from the furnace is cooled in a boiler to generate steam and the steam superheated in a separately fired superheater, said reverberatory furnace and said superheater each having burners the fuel supplies to each being mutually independent, comprising the steps of:
   a. supplying total air to the system in an amount sufficient to satisfy the demands of the ore reduction process in the reverberatory furnace;
   b. supplying fuel to the reverberatory furnace burner in an amount to create gas temperatures sufficient to reduce the ore in the reverberatory furnace;
   c. supplying fuel to the superheater burner to provide the desired air-gas mixture temperature for burning fuel from said reverberatory furnace burner;
   d. passing part of the air to the superheater in an amount in excess of that required for complete combustion of the fuel supplied to said superheater burner;
   e. mixing the heated air-gas mixture from said superheater with the remaining part of the air; and
   f. passing the resultant mixture serially into the reverberatory furnace for use in the reduction of ore therein and thence to said boiler.

2. A process in accordance with claim 1 in which total air is supplied to the system by a single fan and including the step of splitting the air flow therefrom into one part that is supplied to the superheater and another part that is passed in bypass relation thereto.

3. A process in accordance with claim 2 including the step of regulating the steam outlet temperature from the superheater by proportioning the flow of air in the respective parts.

4. In a system for reducing metal ores and for recovering heat generated in the process by generating and superheating steam, the combination of:
   a. a reverberatory furnace having a fuel burner to generate heat for the reduction of said metal ores;

b. a waste heat boiler connected in downstream series relation in the gas flow sense with said reverberatory furnace;
c. a superheater having a fuel burner operatively disposed therein connected in upstream series relation in the gas flow sense with said reverberatory furnace;
d. means for supplying combustion air to said system including:
 i. means for supplying part of said combustion air to said superheater for combustion therein,
 ii. means for supplying another part of said combustion air to the gas flow stream intermediate said superheater and said reverberatory furnace, and
 iii. means for controlling the flow of combustion air in the respective parts.

5. The combination as recited in claim 4 in which the part of said combustion air supplied to said superheater is in excess of the amount necessary to support combustion of the fuel supplied thereto.

6. The combination as recited in claim 4 in which said means for supplying combustion air to said system includes:
a. a fan operative to supply total combustion air to said system;
b. a first duct interconnecting said fan and said superheater;
c. a second duct interconnecting said fan and said gas flow stream intermediate said superheater and said reverberatory furnace; and
d. damper means operative in at least one of said ducts for controlling the flow of combustion air in the respective parts.

7. The combination as recited in claim 6 in which said damper means comprises a single damper operatively disposed in said second duct.

* * * * *